US005305173A

United States Patent [19]

Kakuta et al.

[11] Patent Number: 5,305,173

[45] Date of Patent: Apr. 19, 1994

[54] ELECTRICAL CONNECTOR WITH BREAKING CURRENT FOR LEAK

[75] Inventors: Toshio Kakuta, Higashiosaka; Hiroyuki Nagano, Kadoma; Masaru Imamura, Osaka, all of Japan

[73] Assignee: Hosiden Corporation, Osaka, Japan

[21] Appl. No.: 836,899

[22] Filed: Feb. 19, 1992

[30] Foreign Application Priority Data

Mar. 4, 1991 [JP] Japan ............................ 3-019126[U]

[51] Int. Cl.[5] ............................................. H02H 3/16

[52] U.S. Cl. ..................................... 361/45; 361/115

[58] Field of Search ........................ 361/44, 45, 49, 42

[56] References Cited

U.S. PATENT DOCUMENTS 4,688,134 8/1987 Freeman et al. ...................... 361/45

5,148,344 9/1992 Rao et al. ............................. 361/42

*Primary Examiner*—A. D. Pellinen

*Assistant Examiner*—S. Jackson

*Attorney, Agent, or Firm*—Armstrong, Westerman, Hattori, McLeland & Naughton

[57] ABSTRACT

An electrical connector with the function of instantaneous breaking of a current in response to detection of a leak. The connector comprises: a current supply cord for connecting a load to a source; a pair of plug blades connected electrically with the current supply cord and projected out of a connector body; a sensor mounted in the connector body for detecting a current leak; a breaker device for breaking the connection between the plug blades and the current supply cord in response to a detection by the leak detection sensor. Therein, the breaker device comprises: a pair of movable strips each having a portion thereof fixed to the connector body and a free end; a pair of stationary strips connected to the plug blades; a holder attached to the free ends of the movable strips; a lifter for pulling the holder such that the movable strips are contactual with the stationary strips in resistance to a spring action; a solenoid for being excited in response to a detection by the leak detection sensor; a plunger having a head engaged with the lifter for disengaging, by a move, the engagement between the lifter and the holder in response to excitement of the solenoid; a reset switch connected to the lifter with enablement of pivoting thereof; a spring for biasing the reset switch such that the movable strips tend to contact the stationary strips; thereby a push of the reset switch engaging a nail of the lifter with an engaging mate portion of the holder and in turn the movable strips being pulled toward the stationary strips to be contactual with thereof.

2 Claims, 10 Drawing Sheets

ELECTRICAL CONNECTOR WITH BREAKING CURRENT FOR LEAK

FIELD OF THE INVENTION

This invention relates to an electrical connector with the function of instantaneous breaking of a current in response to detection of a leak.

DESCRIPTION OF THE RELATED ART

The inventors of this application have filed two prior inventions in this art: Japanese Utility Model (UM) Application H1-343969, and Japanese UM Application H2-85315. However, in the preceding art, there have been found the trouble that so many parts are involved and thus much labor cost is required for assembly, and that a current supply cord is laid to run through a sensor for detecting a leak current so that slight dislocation including a distortion or loosening of the cord causes undesirable erroneous magnetism and in turn invites a malfunction sometimes.

This invention has been attained in view of the drawbacks found with the preceding art so that the assembly may be implemented with the less number of parts and that any malfunction due to the current supply cord may be avoided.

SUMMARY OF THE INVENTION

This invention includes as a part an electrical connector with the function of instantaneous breaking of a current in response to detection of a leak which comprises: a current supply cord for connecting a load to a source; a pair of plug blades connected with the current supply cord and projected out of a connector body; a sensor mounted in the connector body for detecting a current leak; a breaker device for breaking the connection between the plug blades and the current supply cord in response to a detection by the leak detection sensor;

said breaker device comprising: a pair of movable strips each having a portion thereof fixed to the connector body; a pair of stationary strips connected to the plug blades; a holder attached to free ends of the movable strips; a lifter for pulling the holder such that the movable strips are contactual with the stationary strips in resistance to a spring action; a solenoid for being excited in response to a detection by the leak detection sensor; a plunger having a head engaged with the lifter for disengaging by a move the engagement between the lifter and the holder in response to excitement of the solenoid; a reset switch connected to the lifter with enablement of pivoting thereof; a spring for biasing the reset switch such that the movable strips tend to contact the stationary strips; thereby a push of the reset switch engaging a nail of the lifter with an engaging mate portion of the holder and in turn the movable strips being pulled toward the stationary strips to be contactual with thereof.

This invention further includes as another aspect an electrical connector with the function of instantaneous breaking of a current in response to detection of a leak which comprises: a current supply cord for connecting a load to a source; a pair of plug blades connected with the current supply cord and projected out of a connector body; a sensor mounted in the connector body for detecting a current leak; a breaker device for breaking the connection between the plug blades and the current supply cord in response to a detection by the leak detection sensor; the current supply cord being connected to the movable strips with a pair of terminal plates made of metal; the terminal plates projecting through a ring-formed sensor for detecting a leak and constituting a part of a testing circuit.

Figure 1:
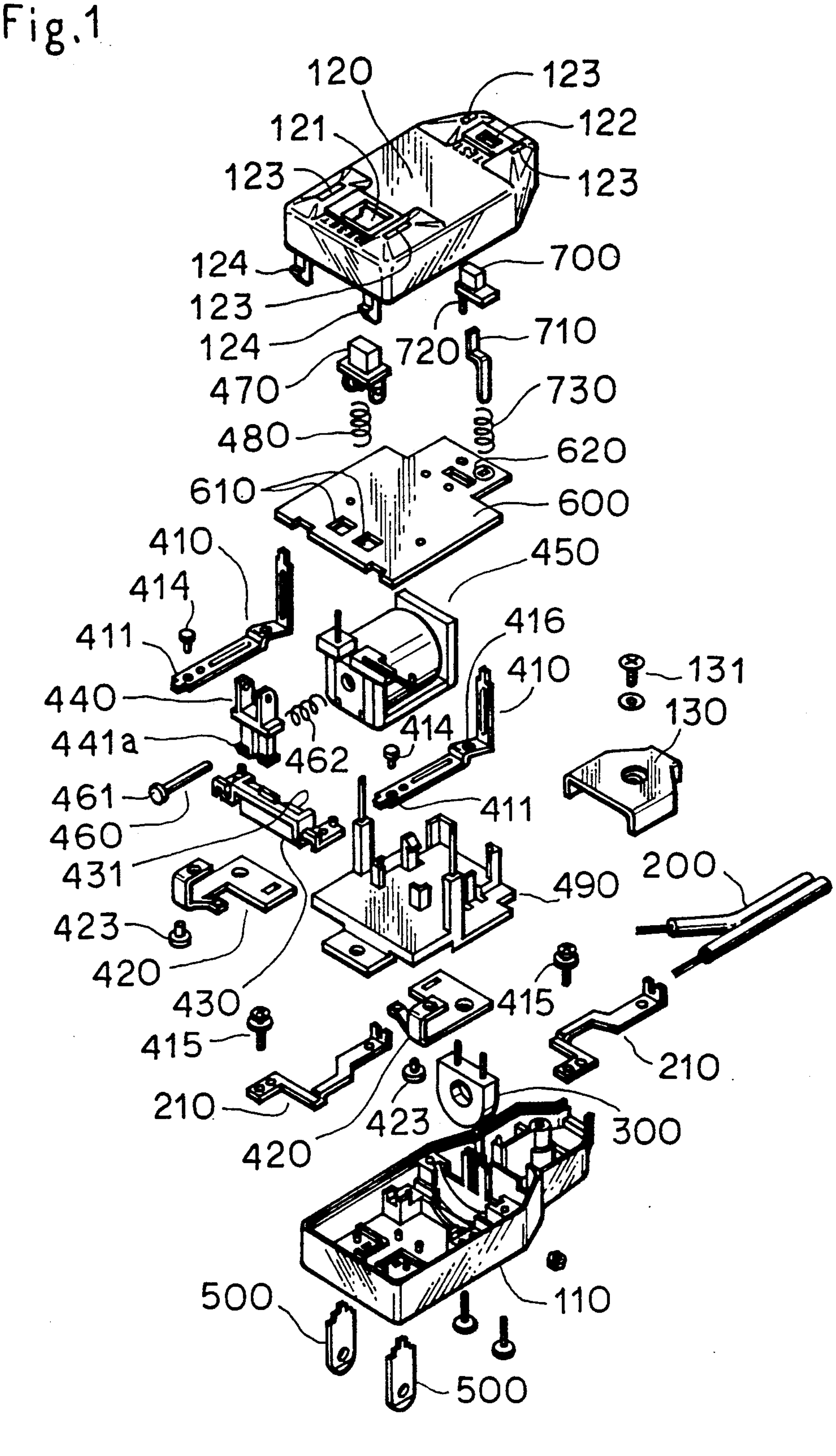
FIG. 1 is a perspective exploded view of an embodiment of the inventive connector.

These drawings are presented for illustrating embodiments of the present invention and therefore these should not be construed as limiting the invention. In the following, the invention will be described with reference to the drawings.

DESCRIPTION OF THE PREFERRED EMBODIMENT(S) OF THE INVENTION

An embodiment to be described is an electrical connector with the function of instantaneous breaking of a current in response to detection of a leak, which comprises: a current supply cord 200 for connecting a load to a source, a pair of plug blades 500 connected electrically with the current supply cord 200 and projected out of a connector body 100; a leak detection sensor 300 mounted in the connector body 100 for detecting a current leak, a breaker device for breaking the connection between the plug blades 500 and the current supply cord 200 in response to a detection by the leak detection sensor 300, in summary.

The breaker device comprises: a pair of movable strips 410 each having a portion thereof fixed to the connector body 100; a pair of stationary strips 420 connected to the plug blades 500; a holder 430 attached to free ends 411 of the movable strips 410; a lifter 440 for pulling the holder 430 such that the movable strips 410 are contactual with the stationary strips 420 in resistance to a spring action; a solenoid 450 for being excited in response to a detection by the leak detection sensor 300; a plunger 460 having a head 461 engaged with the lifter 440 for disengaging, by a move, the engagement between the lifter 440 and the holder 430 in response to excitement of the solenoid 450; a reset switch 470 connected to the lifter 440 with enablement of pivoting thereof; a spring 480 for biasing the reset switch 470 such that the movable strips 410 tend to contact the stationary strips 420; thereby a push of the reset switch 470 engaging a nail 441 of the lifter 440 with an engaging mate portion 431 of the holder 430 and in turn the movable strips 410 being pulled toward the stationary strips 420 to be contactual with thereof.

Figure 3:
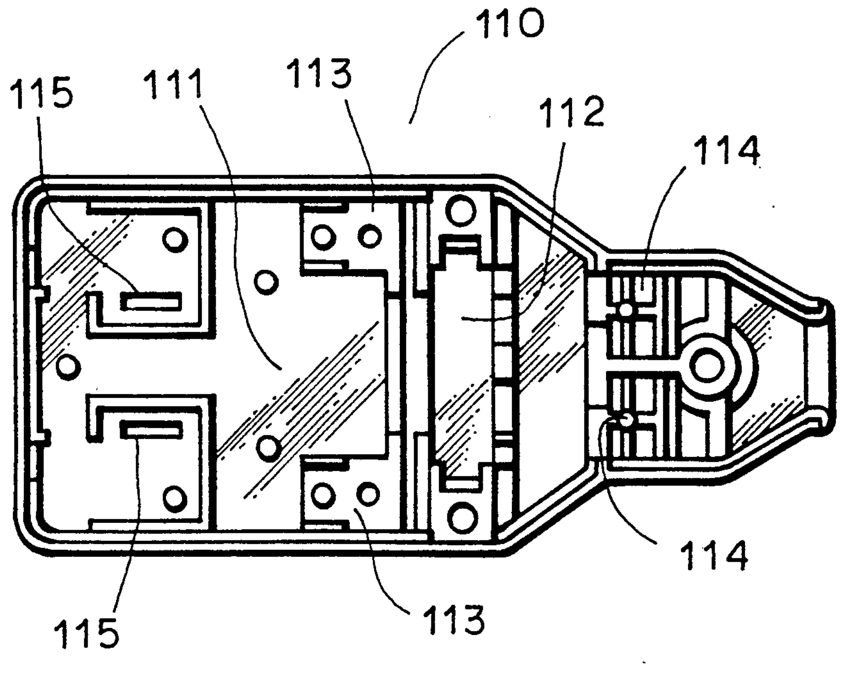
FIG. 3 shows a plan view of a lower body half comprised in a whole connector body of the embodiment as shown in FIG. 1.

Then, the connector body 100 is generally divided into a lower body half 110 on which the breaker device is mounted, a first upper body half 120 which covers most of the lower body half 110, and a second upper body half 130 which covers remnant portion uncovered by the first upper body 120. The lower body half 110 is, as shown in FIG. 3, provided with a solenoid mount 111 on which a solenoid 450 comprised in the breaker device is rested, a sensor mount 112 on which a leak detection sensor 300 is mounted, a pair of movable strip mounts 113 on which a portion of each movable strip 410 is fixed, and a pair of terminal plate mounts 114 on which the pair of the terminal plates 210 are attached. And a pair of openings 115 which admit the pair of plug blades 500 to project are provided with the lower body half 110.

Figure 4:
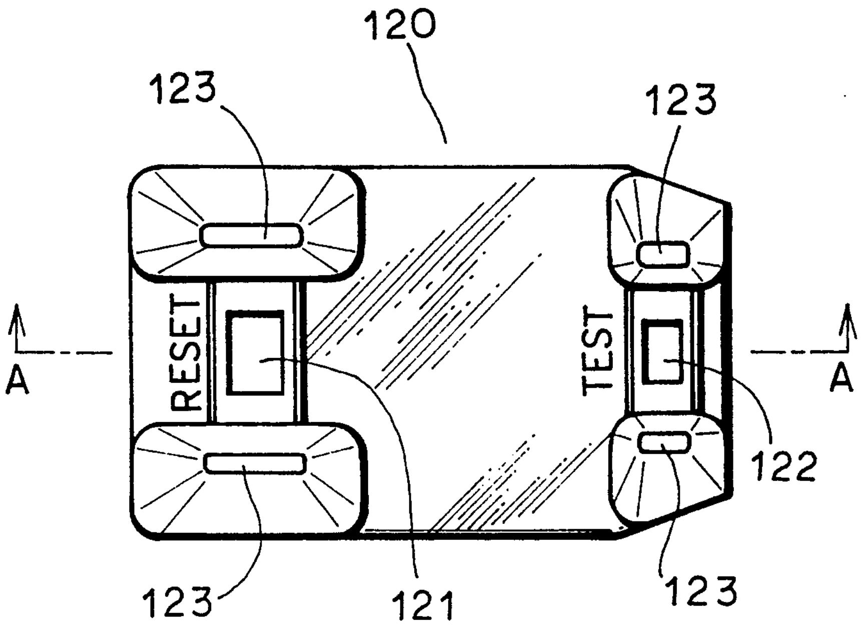
FIG. 4 shows a plan view of an upper body half comprised in the whole connector body of the embodiment as shown in FIG. 1.
Figure 5:
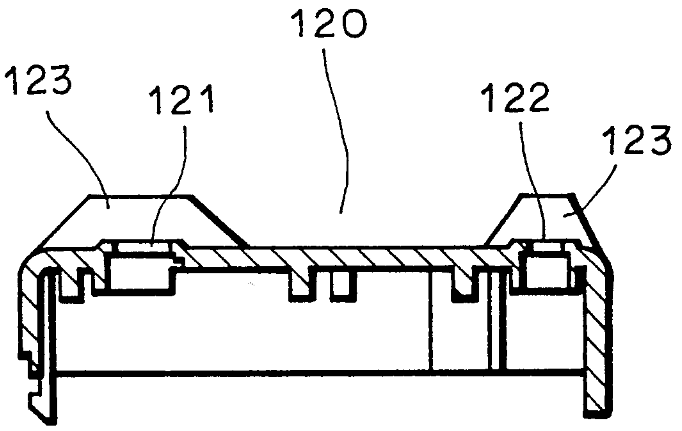
FIG. 5 is a sectional view taken along the line A—A in FIG. 4.

On the other hand, as shown in FIGS. 4 and 5, with the first upper body half 120 provided are openings for two switches; a reset switch opening 121, and test switch opening 122, wherein the reset switch opening 121 is located vertically to align above and between the paired openings 115 for the plug blades, and the test switch opening 122 is located to align above the terminal plate mount 114. Further, around these two switch openings 121, 122 dome coverings 123 are formed to avoid the malfunction, and in the vicinity of the reset switch opening 121 and test switch opening 122, the letters "RESET" and "TEST" are printed respectively. Therein, 124 denotes nails for locking the first upper body half 120 with the lower body half 110 (see FIG. 1), and the second lower body half 130 will be fixed with a bolt 131 to cover the terminal plate mount 114 of the lower body half 114.

Figure 6:
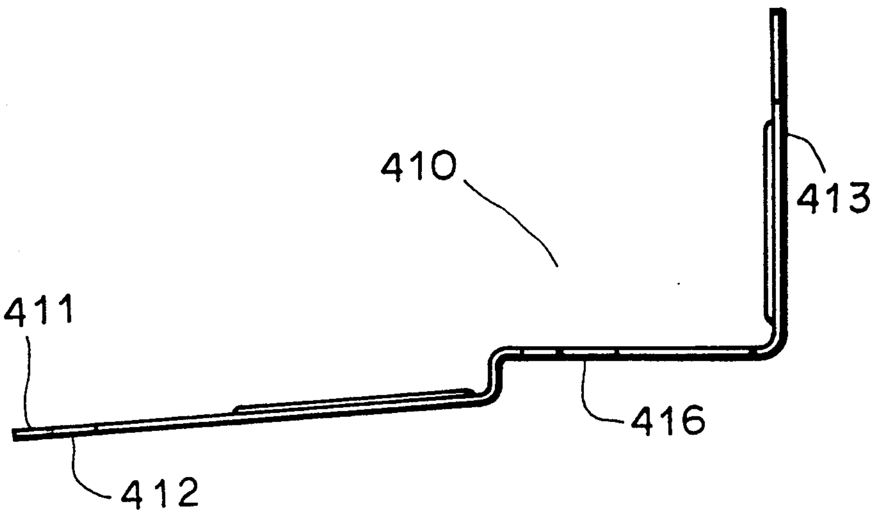
FIG. 6 is a side view of a movable strip.

Turning to reference to details of the breaker device, the movable strip 410 is, as shown in FIG. 6, made from a thin metal plate to have one end lifted up and a middle portion bent stepwise (this step height allows for one end of the terminal plate 210 as will be brought out later) and this strip 410 will be fixed by a bolt 415 (see FIG. 1) with the terminal plate 210 placed thereunder through a hole 416 at the mount 113 on the lower body half 110. And on one end 411 of the strip 410, a movable contact 414 is mounted in a hole 412, and the lifted end 413 forms connection to the printed circuit board 600 which will be apparent later.

Figure 7:
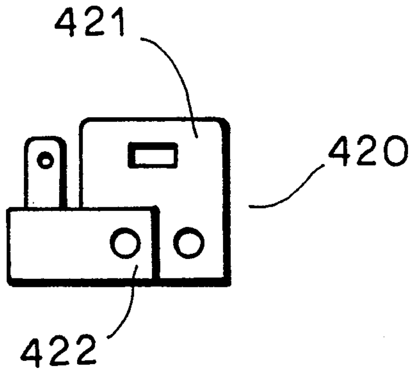
FIG. 7 is a plan view of a stationary strip.
Figure 8:
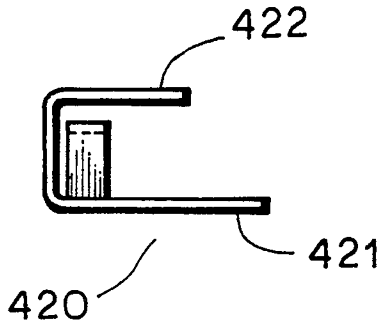
FIG. 8 is a side view of the stationary strip.
Figure 9:
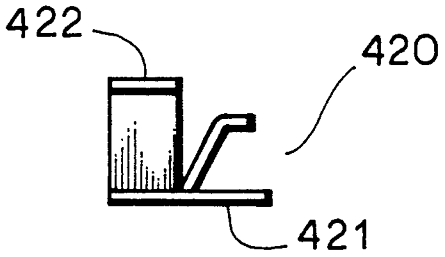
FIG. 9 is a front view of a stationary strip.

The stationary strip 420 is made of a conductive metal and, as shown in FIGS. 7, 8, and 9, comprises a flat portion 421 for mounting the plug blade 500 and a lifted and bent portion like an angular C letter (see FIGS. 2 and 8) to form a contact area 422. And this area 422 is mounted with stationary contact 423 (see FIG. 1). As will be described, in the finished assemblage, as seen from FIG. 2 (this shows a contact state), the movable contact 414 attached to the one end 411 of the movable strip 410 is designed to come inside a space formed by the C letter noted above of the stationary strip 420 and movable vertically, but the movable contact 414 is designed to stay in the space uncontactual if any biasing force is not given.

Figure 10:
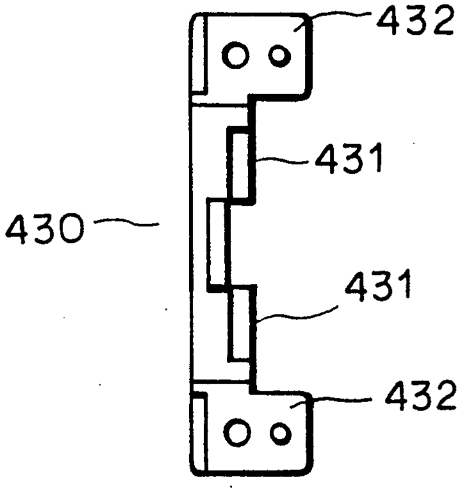
FIG. 10 is a plan view of a holder.
Figure 11:
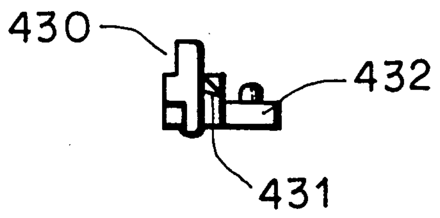
FIG. 11 is a side view of the holder.
Figure 12:
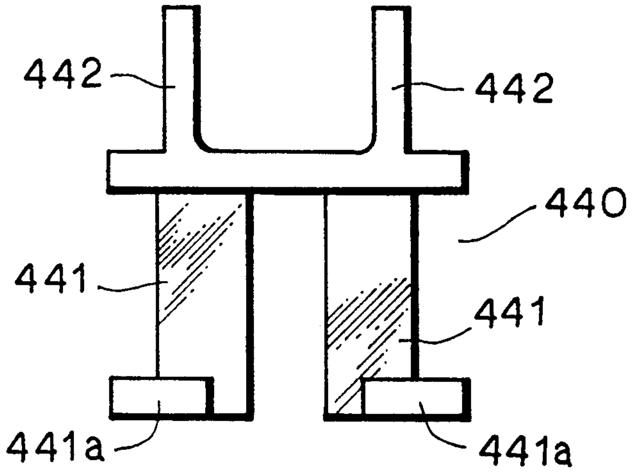
FIG. 12 is a front view of a lifter.
Figure 13:
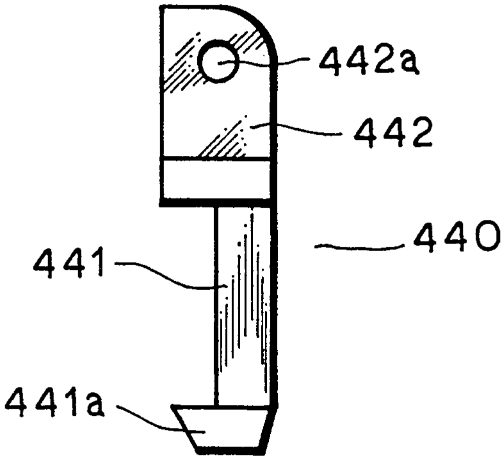
FIG. 13 is a side view of the lifter.

The holder 430 is made of an insulative plastic and is attached to the paired movable ends 411 of the movable strips 410. As shown in FIGS. 10 and 11, the holder 430 has two opposite ends 432 for mounting the paired movable strip ends 411, by which connection the two movable strips 410 will move in unison, wherein in the mounting, the holder ends 432 come under the strip ends 411 and thereby the strip ends 411 (electrically conductive) will not contact the portion 421 of the stationary strip 420 (electrically conductive). This holder 430 has two transversal nails 431 or engaging mates inclining downward which will engage with nails 441*a* of the lifter 440 as will be apparent later. The lifter 440 has, as shown in FIGS. 12 and 13, takes generally an H-letter shape: two raised hands 442 and two legs 441. Each hand 442 has a hole 442*a* and each leg 441 has a nail 441*a*. This nail 441*a* will engage with the nail 431 of the holder 430 and raise up heightwise the holder 430 and thus the movable strip 410. As for the function of the hole 442*a*, the description will be given soon later.

Figure 14:
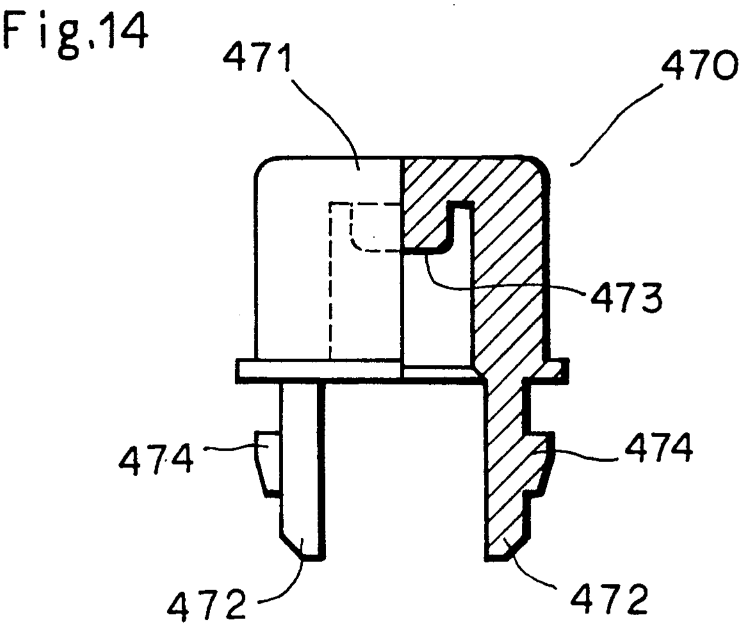
FIG. 14 is a half-sectioned front view of a reset switch.
Figure 15:
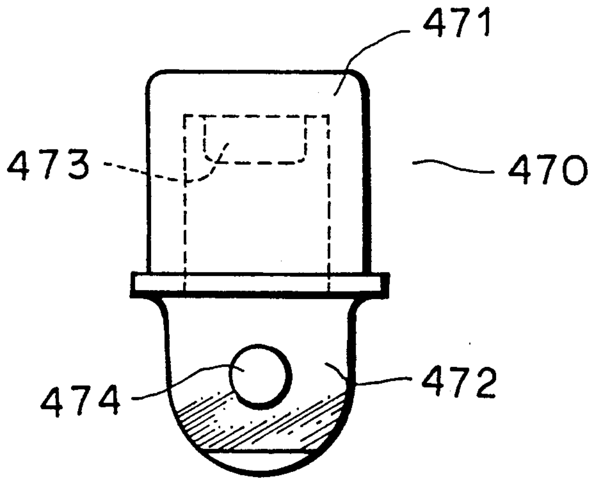
FIG. 15 is a side view of the reset switch.

The reset switch 470 has, as shown in FIGS. 14 and 15, a press portion 471 which will project out of the reset switch opening 121 provided with the first upper body half 120 and a pair of legs 472 which extend from the upper portion 471. Inside the press portion 471, protrusion 473 is formed downward and on outward side of the each leg 472, a round butt 474 is formed so as to engage with the hole 442*a* of the lifter 440 and thereby the lifter 440 is mounted on the reset switch 470 with enablement of a pivotal move about the butt 474. And a coil spring 480 is interjacently placed between the reset switch 470 (specifically between the paired legs 472) and the printed circuit board 600 (see FIG. 1) so that the reset switch is biased upward and in turn the movable strip 410 is constantly biased to contact the stationary strip 420, as is noted above.

Figure 16:
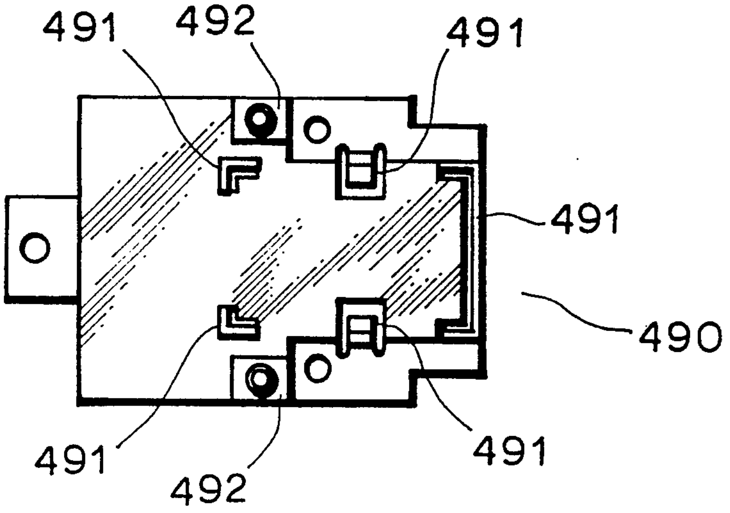
FIG. 16 is a plan view of a base.
Figure 17:
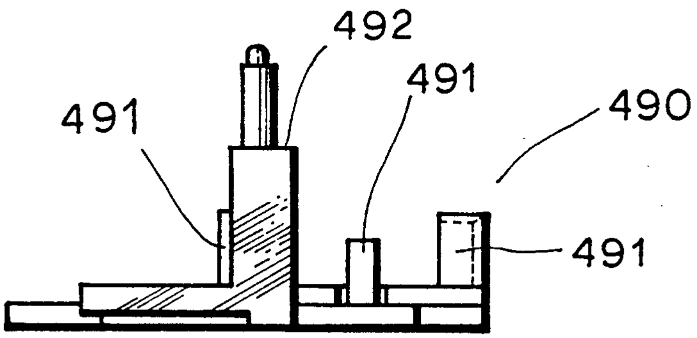
FIG. 17 is a side view of the base.

The solenoid 450 is designed to get excited if the leak detection sensor 300 finds a leak. Once the solenoid 450 is excited, a plunger 460 is attracted into the solenoid 450 in resistance to biasing force of a spring 462, wherein the head 461 of the plunger 460 is engaged with the two legs 441 of the lifter 440 and thereby a move of the plunger 460 into the solenoid 450 causes the lifter 440 to make a pivotal move and further actions will be described later. The solenoid 450 is mounted on a base 490, shown in FIGS. 16 and 17, and rested in the solenoid mount 111 of the lower body half 110. On the upper side of the base 490, formed are walls 491 for resting the solenoid 450 and a pair of shouldered columns 492 for spacing to the printed circuit board 600. The base 490 is designed to have a size and shape to cover a part of the plug blade mount 421 of the stationary strip when the base 490 is mounted on the solenoid mount 111.

Figure 2:
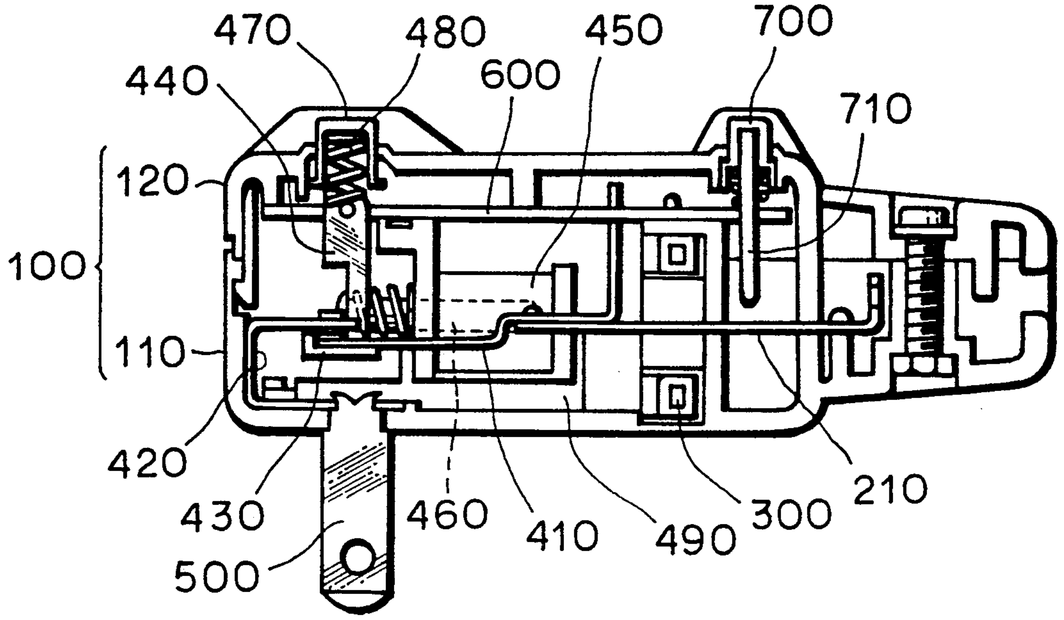
FIG. 2 shows a vertical section of the embodiment as drawn in FIG. 1.
Figure 18:
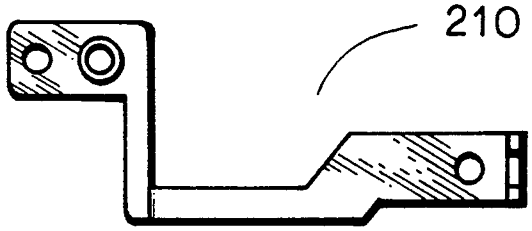
FIG. 18 is a plan view of a terminal plate.

The terminal plate 210, made of a conductive metal, has a crank-like shape, and a pair of these plates 210 are mounted on the terminal plate mounts 114 so as to run through the sensor 300 for detecting a leak current which is shaped in a ring and rested on the sensor device mount 112 (in FIG. 1, two terminal plates 210 are drawn at staggered positions, but as is understood by FIG. 3 or others, the two terminal plates 210 are placed symmetrical about the longitudinal length of the body 110). One end of this plate 210 (the right end in view in FIG. 18) is connected with an end of the current supply cord 200 and, as noted before, the other end (the left end in view in FIG. 18) is fitted with the underside of the movable strip 410 as is seen in FIG. 2 and mounted.

Figure 21:
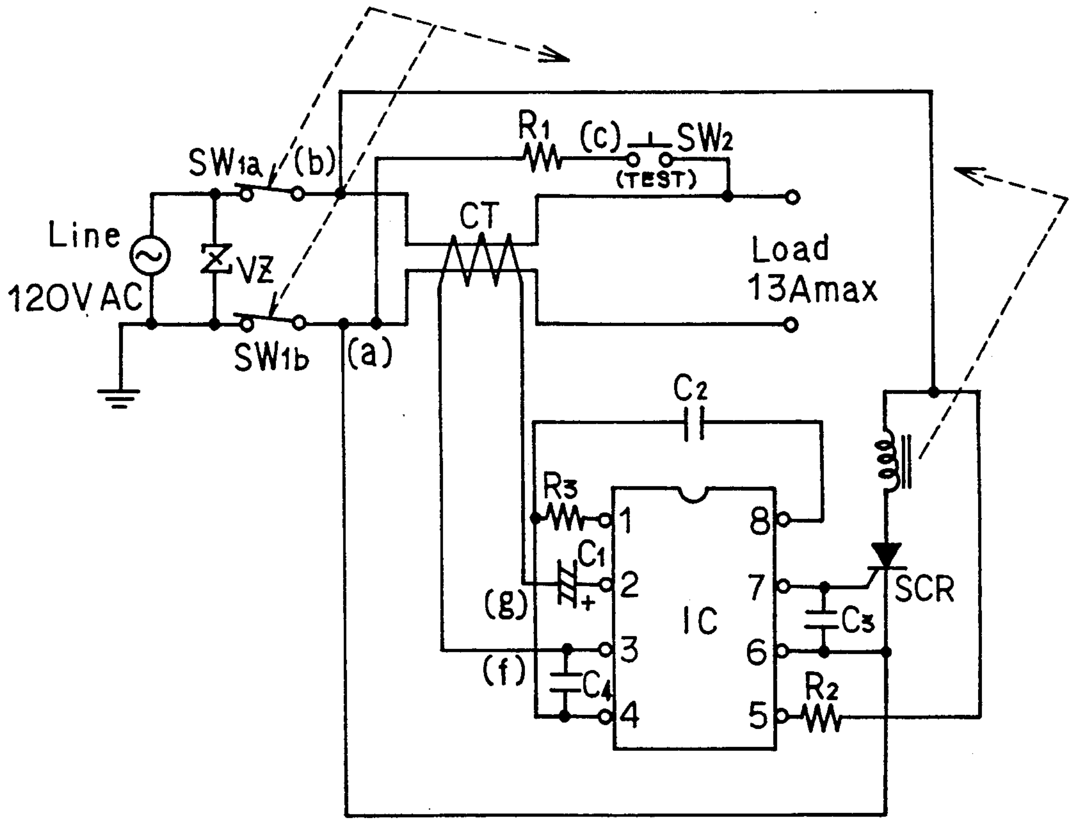
FIG. 21 is a circuit diagram carried on a printed circuit board.

The leak detection sensor 300 is the type of a current sensor to detect magnetism to be caused by a leak current. When this sensor 300 detects any magnetism, a signal will go to the circuit, shown in FIG. 21 and carried on the printed circuit board 600. This printed circuit board 600 is provided with a pair of openings 610 which the legs 472 of the reset switch 470 run through and the other two openings 620 which a guide pin and a rod 710 from a test switch 700 run through as will be described later.

Figure 19:
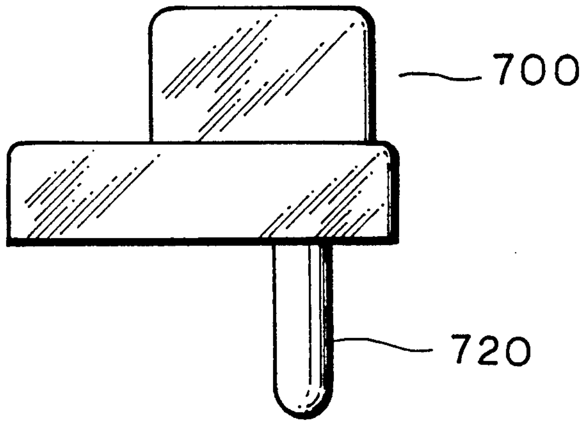
FIG. 19 is a front view of a test switch.
Figure 20:
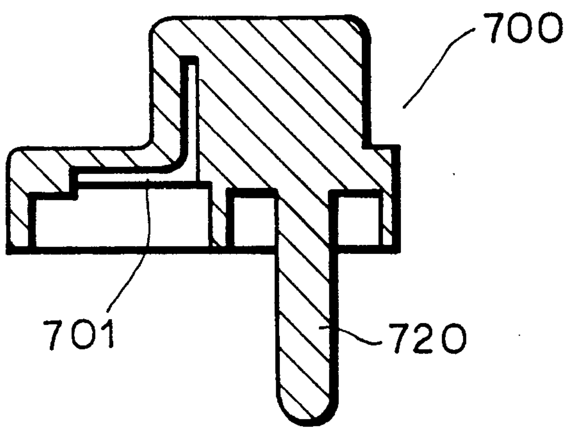
FIG. 20 is a sectional view of the test switch.

Turning to reference to details of the test switch, the embodiment so far described has the test switch 700 as shown in FIGS. 19 and 20 for testing the connector to find if it works to break a current instantaneously as desired in response to a leak current. The test switch 700 comprises the rod 710 which connects the terminal plate 210 to the circuit on the board 600, a guide pin 720 which will guide a vertical action of the test switch 700, and a spring 730 which biases the rod 710 to be away from contacting the circuit, wherein the rod 710 is fixed by being engaged into a recess 701 formed on the underside of the switch 700. And the test switch 700 is incorporated with the spring 730 and is mounted with the guide pin 720 and the rod 710 running through the openings 620 provided on the board 600.

The operation of the connector embodiment will be referred to in the following.

A press of the reset switch 470 causes the nails 441*a* of the lifter 440 to engage with the engaging mates 431 of the holder 430, and thus to raise up the paired movable strips 410 to make the contact ends 414 (or one end of the movable strip 410) contact with the contact areas 422 of the paired stationary strips 420. In this state as shown in FIG. 2 (the cord 200 is not shown), the current supply cord 200 is connected, through the terminal plate 210, movable strip 410, and stationary strip 420, to the plug blade 500, which forms the working state.

Assume that, by any cause, the leak detection sensor 300 senses some magnetism around the cord 200 which is derived from a leak, the solenoid 450 is excited to attract the plunger 460 into the solenoid 450 against the spring 462. Thereby the head 461 of the plunger 460 pulls the lifter 440 toward the solenoid 450 so that the lifter 440 pivots about the round butt 474 toward the solenoid 450 so that the nails 441*a* of the lifter 440 become disengaged from the engaging mates 431 of the holder 430, and in turn, the lifter 440 is pulled upward by the spring 180.

The movable strips 410 lost the engagement with the holder 430 and have returned to be uncontactual with the stationary strips 420. Thus a break is formed between the movable and stationary strips 410, 420 and the current supply is suspended.

If a press of the reset switch 470 takes place to engage the lifter 440 with the holder 430, and if the cause for the current leak is not yet dissolved, although a contact between the movable strip and the stationary strip may be reformed, the same derivation with the breaking device takes place as noted above to break the current instantaneously. Check of the breaking device to know if normal break action is obtained is done with use of the test switch 700. That is, the press of the test switch 700 causes, by a move of the rod 710, connection of the terminal plates 210 to the circuit and thereby the solenoid 450 is excited and in turn the contact between the movable strips 410 and the stationary strips 420 are broken.

As is understood by the descriptions so far, a connector of the present invention may be assembled with relatively small number of parts and a leak is designed to be detected by magnetism occurring around the terminal plate 210, instead of the current supply cord 200, which design overcomes the drawbacks incidental with the conventional art.

What is claimed is:

1. An electrical connector for the instantaneous breaking of a current in response to the detection of a leak, comprising:
   - a current supply cord for connecting a load to a source;
   - a pair of plug blades connectable electrically with the current supply cord and projected out of a connector body;
   - a sensor mounted in the connector body for detecting a current leak;
   - a breaker device for breaking the connection between the plug blades and the current supply cord in response to a detection by the leak detection sensor;
   - said breaker device including a pair of movable strips each having a portion thereof fixed to the connector body and a free end, a pair of stationary strips connected to the plug blades, a holder attached to the free ends of the movable strips, a lifter for pulling the holder such that the movable strips are contractual with the stationary strips in resistance to a spring action, a solenoid for being excited in response to a detection by the leak detection sensor, a reset switch pivotally connected to the lifter with the lifter pivoting around a pivot point provided on said reset switch, a plunger having a head which is engageable with the lifter for disengaging an engagement between the lifter and the holder by pivoting the lifter in response to excitement of the solenoid, a spring for biasing the reset switch such that the movable strips tend to contact the stationary strips, a nail of the lifter being engageable with an engaging mate portion of the holder by pushing the reset switch.

2. An electrical connector for the instantaneous breaking of a current in response to the detection of a leak, comprising:
   - a current supply cord for connecting a load to a source;
   - a pair of plug blades connectable electrically with the current supply cord and projected out of a connector body;
   - a sensor mounted in the connector body for detecting a current leak;
   - a breaker device for breaking the connection between the plug blades and the current supply cord in response to a detection by the leak detection sensor;
   - the current supply cord being connected to the movable strips with a pair of terminal plates made of metal; and
   - the terminal plates extending through a ring-formed sensor for detecting a leak and constituting a part of a testing circuit.

* * * * *